United States Patent
Smith (10) Patent No.: US 9,001,647 B2
(45) Date of Patent: *Apr. 7, 2015

(54) DISTRIBUTED FAILURE RECOVERY IN A ROUTED ETHERNET NETWORK

(71) Applicant: Rockstar Consortium US LP, Plano, TX (US)

(72) Inventor: Peter Ashwood Smith, Hull (CA)

(73) Assignee: RPX Clearinghouse LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,021

(22) Filed: Dec. 17, 2013

(65) Prior Publication Data

US 2014/0105001 A1 Apr. 17, 2014

Related U.S. Application Data

(63) Continuation of application No. 13/185,676, filed on Jul. 19, 2011, now Pat. No. 8,630,167, and a continuation of application No. PCT/CA2011/000288, filed on Mar. 18, 2011.

(60) Provisional application No. 61/318,123, filed on Mar. 26, 2010.

(51) Int. Cl.
*G06F 11/00* (2006.01)
*H04L 12/24* (2006.01)
(Continued)

(52) U.S. Cl.
CPC ............ *H04L 41/0668* (2013.01); *H04L 45/00* (2013.01); *H04L 45/02* (2013.01); *H04L 45/22* (2013.01); *H04L 45/28* (2013.01); *H04L 45/66* (2013.01)

(58) Field of Classification Search
CPC ..... H04L 41/0668; H04L 45/00; H04L 45/02; H04L 45/22; H04L 45/28; H04L 45/66
USPC ............. 370/217–218, 225–228, 230, 230.1, 370/231, 235, 389, 392, 395.3, 395.31, 370/395.32, 428–429, 465
See application file for complete search history.

(56) References Cited

U.S. PATENT DOCUMENTS 6,910,148 B1 * 6/2005 Ho et al. ........................ 714/4.4
7,804,770 B2 * 9/2010 Ng ................................. 370/219
(Continued)

FOREIGN PATENT DOCUMENTS

JP 2003-258829 9/2003

OTHER PUBLICATIONS

Office Action from corresponding Japanese Patent Application 2013-500289 dated Dec. 2, 2014.

*Primary Examiner* — Kevin Mew
(74) *Attorney, Agent, or Firm* — Anderson Gorecki & Rouille LLP (57) ABSTRACT

Link identifiers such as VIDs, selected from a defined range of values, are locally assigned by each node on a link state protocol controlled Ethernet network to each of its links or adjacencies. The link identifiers are assigned by the nodes such that each link or adjacency at the node is uniquely identified by a different link identifier. A link state protocol adjacency notification mechanism or other flooding mechanism is used to disseminate the locally assigned link identifiers to other nodes on the link state protocol controlled Ethernet network. The link identifiers are added by the nodes to their topology databases to enable detour routes to be locally calculated by the nodes on the network in a distributed manner. Upon occurrence of a failure, the link identifiers are used to source route traffic around the failure so that traffic may continue to traverse the link state protocol controlled Ethernet network.

20 Claims, 7 Drawing Sheets

(51) Int. Cl.
*H04L 12/701* (2013.01)
*H04L 12/751* (2013.01)
*H04L 12/707* (2013.01)
*H04L 12/703* (2013.01)
*H04L 12/721* (2013.01)

(56) References Cited

U.S. PATENT DOCUMENTS

| | | | |
|---|---|---|---|
| 8,072,879 B2 * | 12/2011 | Vasseur et al. | 370/225 |
| 8,089,866 B2 * | 1/2012 | Smith et al. | 370/225 |
| 8,208,372 B2 * | 6/2012 | Vasseur et al. | 370/225 |
| 8,630,167 B2 * | 1/2014 | Smith | 370/225 |
| 2005/0201273 A1 | 9/2005 | Shimizu | |
| 2007/0165515 A1 * | 7/2007 | Vasseur | 370/216 |
| 2007/0183317 A1 * | 8/2007 | Vasseur et al. | 370/225 |
| 2007/0280102 A1 * | 12/2007 | Vasseur et al. | 370/225 |
| 2008/0008104 A1 * | 1/2008 | Previdi et al. | 370/255 |
| 2008/0267116 A1 * | 10/2008 | Kang et al. | 370/328 |
| 2009/0252033 A1 * | 10/2009 | Ramakrishnan et al. | 370/228 |
| 2010/0188971 A1 * | 7/2010 | Chiang | 370/225 |
| 2011/0022725 A1 * | 1/2011 | Farkas | 709/238 |
| 2011/0038257 A1 * | 2/2011 | Banerjee et al. | 370/225 |

\* cited by examiner

DISTRIBUTED FAILURE RECOVERY IN A ROUTED ETHERNET NETWORK

CROSS-REFERENCE TO RELATED APPLICATIONS

This application is a continuation of U.S. patent application Ser. No. 13/185,676, filed Jul. 18, 2011, which is a continuation of International Application PCT/CA2011/000288, filed Mar. 18, 2011, which claims priority to U.S. Provisional Patent Application No. 61/318,123, filed Mar. 26, 2010, entitled Source Routed VID Tunnels for Ethernet Packet Steering, the content of each of which is hereby incorporated herein by reference.

TECHNICAL FIELD

The present invention relates to routed Ethernet networks and, more particularly, to distributed detour creation in a routed Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units over communication links interconnecting the network elements. The data may be organized into discrete pieces for transmission on the communication network, so that multiple data streams may share the resources of the communication network. Common ways of segmenting data include creation of Internet Protocol (IP) packets or Ethernet frames which may be individually forwarded across the communication network. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how the network elements should exchange information between each other to enable them to interoperate on the network.

Ethernet is a well known networking protocol that has been defined by the Institute of Electrical and Electronics Engineers (IEEE) as standard 802.3, which specifies the physical layer, and 802.1, which specifies the network layer. This application is focused on the network layer aspect and, as used herein, the term "Ethernet network" refers to a network which implements one or more of the 802.1 family of protocols including, for example, 802.1, 802.1Q, 802.1ad, 802.1ah, 802.1Qay, or 802.1aq. The 802.1 family of protocols generally specifies that an Ethernet header be applied to a packet so that nodes on the network may forward the packet toward its intended destination. Depending on the particular protocol in use on the network, this Ethernet header may include a source MAC address, destination MAC address, one or more Virtual Local Area Network Identifiers (VIDs) and optionally other fields. Multiple headers may be included as well, for example a first header may be applied using a client MAC addressing space and a second outer header may be included using network service provider MAC addressing space.

In Ethernet network architectures, devices connected to the network compete for the ability to use shared telecommunications paths at any given time. Where multiple bridges or nodes are used to interconnect network segments, multiple potential paths to the same destination often exist. A benefit of this architecture is that it provides path redundancy between bridges and permits capacity to be added to the network in the form of additional links. However to prevent loops from being formed, a spanning tree was generally used to restrict the manner in which traffic was broadcast or flooded on the network. A characteristic of spanning tree is that there is only one path between any pair of destinations in the network, and therefore it was possible to "learn" the connectivity associated with a given spanning tree by watching where packets came from. 802.1Q, 802.1 ad, and 802.1 ah all use one or more spanning tree instances in the control plane to determine which links should be active and which should be blocked to prevent the formation of loops.

To overcome some of the limitations inherent in Ethernet networks implementing a spanning tree, IEEE 802.1aq has been developed which enables the nodes on the network to implement a link state routing protocol to control forwarding of Ethernet frames on the network. Two examples of link state routing protocols include Open Shortest Path First (OSPF) and Intermediate System to Intermediate System (IS-IS). As used herein, the term "link state protocol controlled Ethernet network" will refer to an 802.1 Ethernet network, which uses a link state routing protocol to control installation of forwarding state which is used by the nodes to forward data traffic on the network.

When a link state protocol is used to control the Ethernet network, rather than utilizing a learned network view at each node by using the Spanning Tree Protocol (STP) algorithm combined with transparent bridging, the bridges forming the network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network.

When all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (p2 mp) multicast tree from any given bridge to the same set or subset of peer bridges per service instance hosted at the bridge. The result is the path between a given bridge pair is not constrained to using the links on the spanning tree and the overall result can better utilize the breadth of connectivity of a set of nodes interconnected in a mesh. In essence every bridge roots one or more trees which define unicast connectivity to that bridge, and multicast connectivity from that bridge.

In Ethernet networks, like other networks, handling of failures is important to ensure continued availability of the network. Typically networks aim to have the network recover from a failure within 50 msec. Also, from an implementation standpoint, ideally it is desirable to implement failure recovery without requiring additional tunnels to be signaled on the network and without requiring additional encapsulation. For example, in an MPLS network, fast re-route has been developed which allows traffic to be placed on an alternate path through the network upon occurrence of a failure. However, the fast reroute solution needs signaling, requires the nodes on the MPLS network to maintain state for the tunnels, and needs encapsulation for even two hop reroute tunnels. Further, MPLS reroute is not applicable to Ethernet since it requires IP addressing, which is not native to Ethernet. Accordingly, it would be desirable to provide a method and apparatus for implementing distributed failure recovery in a routed Ethernet network.

SUMMARY

The following Summary and the Abstract are provided herein to introduce some concepts discussed in the Detailed Description below. The Summary and Abstract sections are not comprehensive and are not intended to delineate the scope of protectable subject matter which is set forth by the claims presented below.

Link identifiers are locally assigned by each node on a link state protocol controlled Ethernet network to each of its links or adjacencies. The link identifiers may be Virtual Local Area Network Identifiers (VIDs), and are assigned by the nodes such that each link or adjacency at the node is uniquely identified by a different link identifier. A specified range of link identifiers is used to enable nodes on the network to distinguish traffic associated with the locally assigned link identifiers from other traffic on the network.

A link state protocol adjacency notification mechanism or other flooding mechanism is used to disseminate the locally assigned link identifiers to other nodes on the link state protocol controlled Ethernet network. The link identifiers are added by the nodes to their topology databases to enable detour routes to be locally calculated by the nodes on the network in a distributed manner. Upon occurrence of a failure, the link identifiers are used to route traffic around the failure so that traffic may continue to traverse the link state protocol controlled Ethernet network. In one embodiment, an ordered list of link identifiers may be used as a source route. In another embodiment, upon occurrence of a failure, a node upstream of the failure will calculate a detour route around the failure and include a link identifier at a downstream node which the downstream node has assigned to an output link that will enable traffic to be transmitted to a node on the original data path to allow traffic to be diverted around the failure and rejoin the original data path through the network. When a node receives a frame containing a link identifier, e.g. VID, with a value within a range of values reserved for locally assigned link identifiers, it will process the frame to cause the frame to be passed on the output link which is locally identified by the link identifier. If a node receives a frame containing a link identifier within the reserved range which matches the link identifier assigned to the input link at the node, the node will interpret this as an indication that it is the termination point of the detour and will replace the link identifier with the application VID and forward the frame using normal shortest path forwarding.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
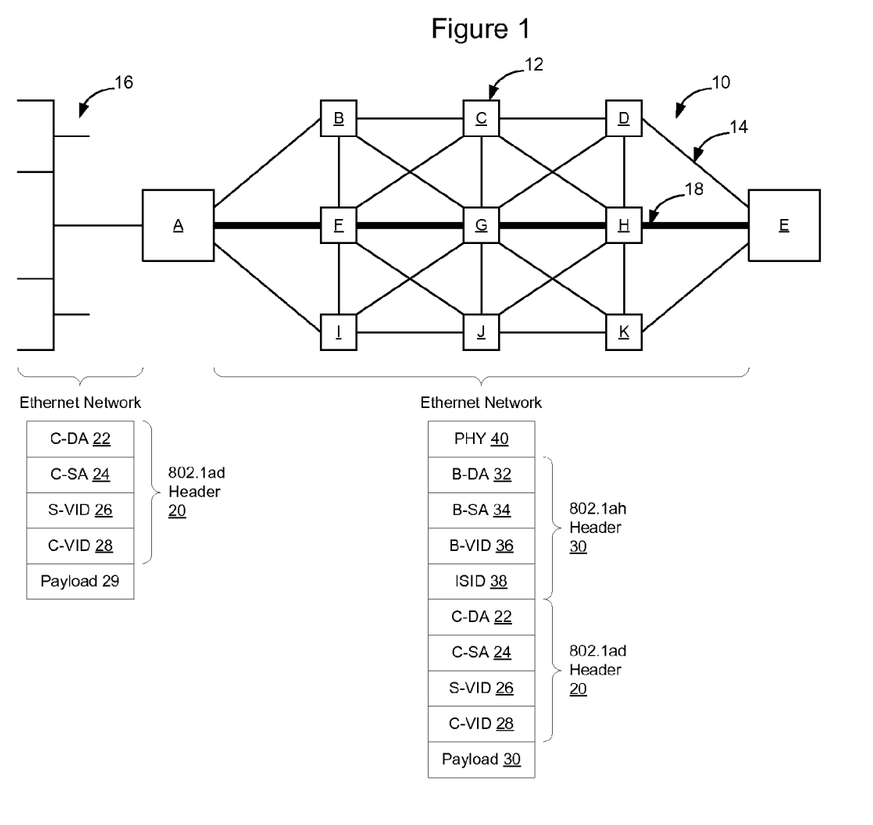
FIG. 1 is a functional block diagram of an example Ethernet network.

FIG. 1 shows an example Ethernet network 10 including nodes 12, labeled A through K. The nodes 12 are interconnected by links 14. The nodes on the network implement a link state routing protocol such as Intermediate System to Intermediate System (IS-IS) or other link state routing protocol to exchange adjacency information. As the nodes on the network learn adjacency information about their neighboring nodes, the nodes will generate and flood Link State Advertisements (LSAs). The nodes use the information about network topology from the LSAs to build a link state database which may be used to calculate shortest paths and other routes through the network.

In the example communication network shown in FIG. 1, node A interconnects the network 10 with a client network 16. Ethernet traffic on the client network will have a payload 29 and a client (C) header 20, including a Client Destination MAC Address (C-DA) 22, Source MAC Address (C-SA) 24, and at least one Virtual Local Area Network ID (VID). In the example shown in FIG. 1, the client header includes both an S-VID 26 and a C-VID 28 as provided by IEEE 802.1ad. Alternatively, the client header could include only a C-VID as provided in 802.1Q or may include no VLAN ID, depending on the particular Ethernet frame format specified by the 802.1 protocol in use on the client network 16.

When the client frame is passed to the provider network, the access node A will encapsulate the client traffic with a provider header 30. This allows the nodes (nodes B-K) to implement forwarding based on provider based MAC address space rather than requiring the nodes to perform forwarding based on client MAC address space.

In the example shown in FIG. 1, the provider header 30 includes a provider (B) Destination MAC Address (B-DA) 32, a provider Source MAC Address (B-SA) 34, a provider VLAN ID (B-VID) 36, and a Service Identifier (ISID) 38. Encapsulation of this nature is specified in IEEE 802.1ah. Use of a link state protocol to control forwarding of traffic on an Ethernet network is specified in IEEE 802.1aq. A physical (IEEE 802.3) Ethernet header 40 may also be applied depending on the particular implementation.

Embodiments of the invention may be utilized in many forms of Ethernet networks whenever a link state routing protocol is used to control forwarding of traffic on the Ethernet network. Hence, if the client network is organized in this manner an embodiment of the invention may be utilized within the client network using C-VID or S-VID values to create detours in a distributed manner as discussed in greater detail below. Likewise, where the provider network is implemented using a link state routing protocol, an embodiment of the invention may be utilized in the provider network using the B-VID or the ISID values to create detours in a distributed manner, as discussed in greater detail below. The ISID value is generally not used in connection with making forwarding decisions on the network, however, so preferably the VID field is used to implement the distributed creation of detours described in greater detail herein.

Figure 2:
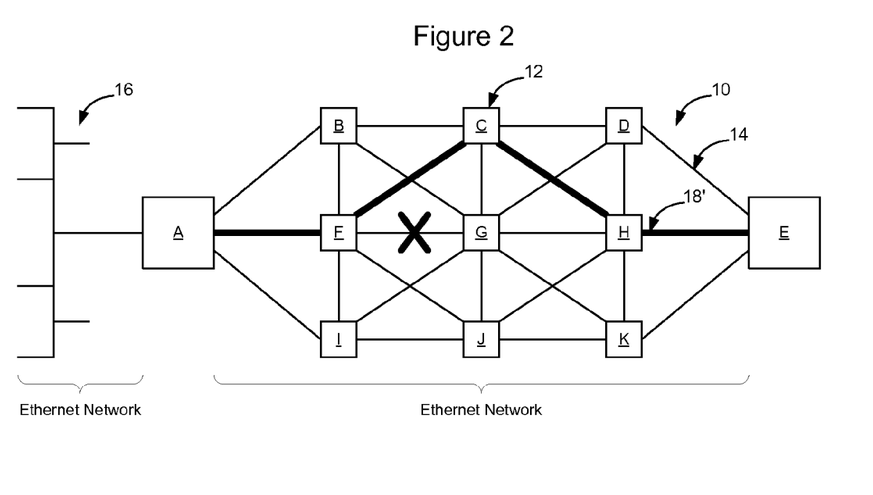
FIG. 2 is a functional block diagram showing rerouting of traffic upon occurrence of a fault in the example network of FIG. 1.

In FIG. 1, a shortest path from node A to node E is shown by dark line 18. The shortest path in this example includes nodes A, F, G, H, and E. If there is a failure on the path between nodes A and E, such as on the link between nodes F and G, it would be desirable to enable the nodes adjacent the failure to perform local failure protection to enable traffic to be routed around the failure. Having nodes local to the failure use information contained in the nodes enables detour creation to be implemented in a distributed manner, since central determination of a detour and signaling of the detour is not required. For example, as shown in FIG. 2, node F may divert traffic to node C, which will then forward traffic to node H to be forwarded on to node E. Ideally, diverting traffic around the failure should be done without signaling the alternate routes or coordination between nodes.

According to an embodiment of the invention, nodes on the network assign link identifiers to their links or to adjacencies on the network. The link identifiers may be implemented using VLAN IDs (VIDs) such as C-VID 28, S-VID 26, or B-VID 36 which are selected from a reserved range of VID values. Alternatively, a particular B-VID may be used for local re-route and ISID values may be assigned to the links on the network. The term "link identifiers" will be used herein to refer to the values that are assigned by the nodes on the network to the links that connect to the node or to the node's adjacencies. Each node will assign a different link identifier to each of its links, such that there is a one-to-one correspondence between link identifier and link at the node or between the link identifier and adjacency at the node. The link identifiers are not globally unique (i.e. are not unique within the network) since multiple nodes on the network will each assign link identifiers to its links from within the reserved range of link identifiers.

The assigned link identifiers are communicated to other nodes on the network using link state routing protocol (e.g. IS-IS) link state advertisements. Using the link state routing protocol enables the nodes to communicate link identifier assignment information along with adjacency information so that neighbor nodes on the network can include the link assignment information in their topology databases.

Figure 3:
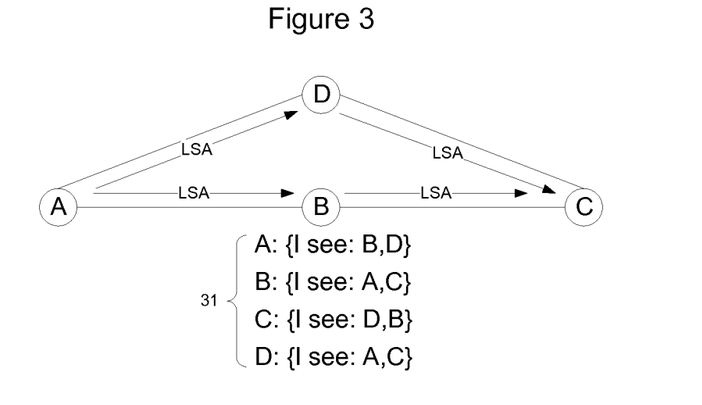
FIG. 3 is a functional block diagram of a portion of an example link state routed Ethernet network showing dissemination of link state advertisements between nodes.

FIG. 3 shows a small portion of an Ethernet network including four nodes A-D. FIG. 3 also shows how normal link state advertisements are used in a link state routing protocol such as IS-IS. Specifically, IS-IS specifies that nodes should listen to detect neighboring nodes. When a node has a neighboring node that is visible on a link, it is said to have an "adjacency" with that node. In addition to listening for adjacencies on its links, each node on the network will transmit a list of its adjacencies using a link state advertisement which will be flooded to all nodes on the network.

For example, as shown in FIG. 3, each node on the network will generate and transmit a link state advertisement 31 to tell the other nodes on the network what nodes it is able to see. In FIG. 3, node A will transmit a link state advertisement 31 indicating that it can see, and hence has an adjacency with, nodes B and D. This LSA {I see: B, D} will be flooded on the network by transmitting the LSA on all active links to all other nodes on the network. Hence, this LSA will be received by nodes D and B, and will be forwarded by one or both of these nodes on toward node C. Similarly, as shown in FIG. 3, node D will generate and transmit a LSA specifying that it can see nodes A and C. Likewise, node C will transmit LSA {I see: D, B} since node C is connected to nodes B and D. Node B will generate LSAs similar to node D. Flooding of link state advertisements is well known and understood in the art.

Figure 4:
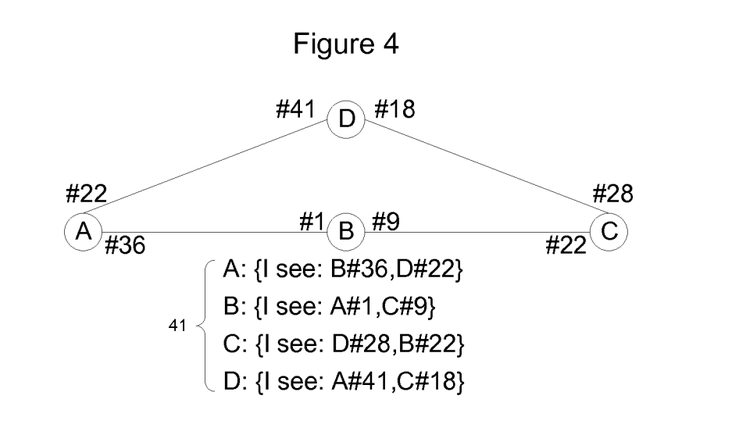
FIG. 4 is a functional block diagram of the portion of the network of FIG. 3 showing dissemination of VID assignments as well as link state advertisements between nodes.

FIG. 4 shows an embodiment in which the LSAs transmitted by the nodes are modified to include link identifiers, such as a VLAN IDs, that have been assigned by the node to the adjacencies or to the links on which the neighboring nodes are visible. In the following description, an embodiment will be described in which the link identifiers are VIDs. As noted above, other types of link identifiers may be used as well.

In one embodiment, the VIDs assigned by the nodes to their adjacencies (or links) are all selected from a relatively small range of VID numbers. For example, in a fully meshed communication network, it would be expected that a given node would be connected to at most on the order of 30 other nodes. In other networks, such as IEEE 802.1aq, the nodes may be connected to up to 64 neighbors. Hence, the range of VIDs should be at least large enough to accommodate a unique assignment by a given node of one VID per neighbor for the largest number of expected adjacencies. Where Equal Cost Multi-Path is an issue, the number of VIDs within the range should be increased to enable different VIDs to be assigned to the different paths. Hence, a set of VIDs on the order of up to 128 VIDs may be set aside and used by the nodes to designate links (or adjacencies) on the network. Since each of the nodes will assign VIDs from this range to its adjacencies/links, it will be expected that the VIDs assigned to the adjacencies/links will not be unique on the network.

Referring back to FIG. 4, node A has assigned VID #36 to the link connecting node A to node B. Alternatively, node A may be viewed as assigning VID #36 to its adjacency with node B. Likewise, node A has assigned VID #22 to the link connecting node A and node D (or to its adjacency with node D). Hence, instead of transmitting a LSA as described above in connection with FIG. 3 {I see: B, D}, node A will transmit a LSA 41 including the VIDs assigned to the links on which it can reach the nodes, as well as the node IDs. Thus, as shown in FIG. 4, node A will transmit a LSA {I see: B #36, D #22}. Each of the other nodes will also assign VIDs from the specified range of VIDs such that, in FIG. 4, node B will transmit LSA {I see: A #1, C #9}; node C will transmit LSA {I see: D #28, B #22}; and node D will transmit LSA {I see: A #41, C #18}. Note that each of the nodes has assigned a unique VID to each of its links or adjacencies such that a specific link identifier uniquely identifies the link/adjacency on that node. However, since all of the nodes on the network assign link identifiers using the same small range of link identifiers, it is likely that different nodes will use the same link identifier. For example, in FIG. 4 nodes A and C both used link identifier #22 to identify a particular link/adjacency at those nodes. Thus, the link identifiers are not required to be globally unique on the network. Assignment of VIDs by the nodes is also not coordinated between the nodes on the network, as each node assigns VIDs without consideration which VIDs have been assigned to links/adjacencies by other nodes on the network.

Upon receiving the LSAs, each of the nodes will include the VID information along with the adjacency information in their link state database. Accordingly, once each node has assigned VIDs to each of its links (or adjacencies) and advertised the link identifier assignment on the network, each node will have information within its link state database that it can use to calculate traffic engineered paths through the network. The traffic engineered paths may be one hop paths to enable local detours to be calculated to bypass failures on the network or may be longer paths to enable traffic to be source routed through the network by specifying a series of link identifiers to be used to forward traffic at each hop through the network.

Figure 5:
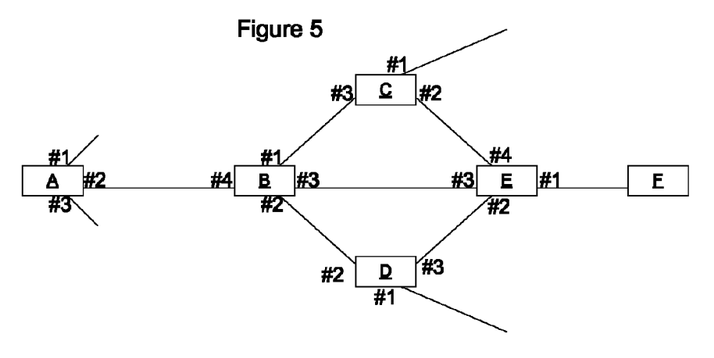
FIG. 5 is a functional block diagram of a portion of an example link state routed Ethernet network showing VID assignment per link or per adjacency.
Figure 6:
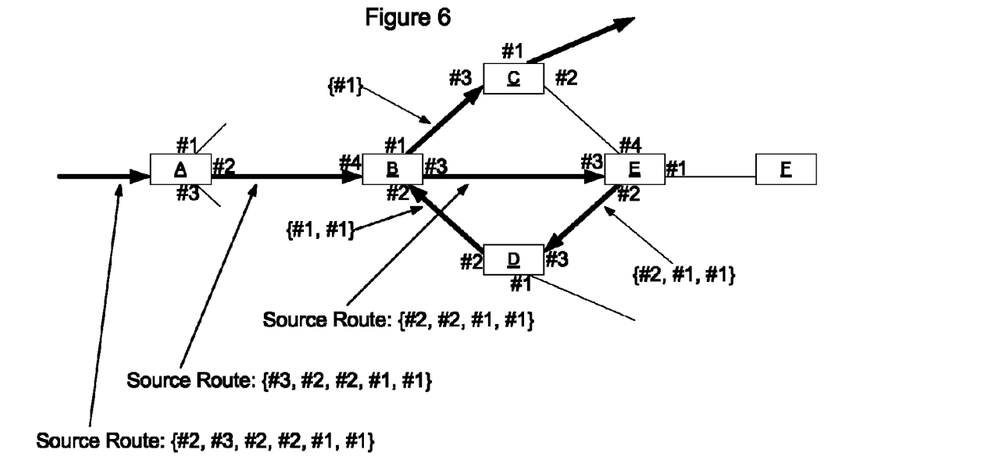
FIG. 6 is a functional block diagram illustrating use of the VID assignment to implement source routing in the network of FIG. 5.

FIGS. 5 and 6 show an example network in which each of the nodes has assigned a VID to each of its links or adjacencies and advertised the assigned values on the network via LSAs. If node A would like to transmit traffic to node C, it may use normal shortest path forwarding or, alternatively, may specify a source route formed from the VIDs advertised by the nodes on the network.

For example, as shown in FIG. 6, node A may include an ordered list of VIDs where each VID corresponds with an intended output link at a particular node on the network. To cause traffic to follow the path indicated by the dark arrows such that traffic goes from node A→node B→node E→node D→node B→node C, and from node C out the link indicated with a dark arrow, a VID based source route {#2, #3, #2, #2, #1, #1} may be used. Specifically, node A has locally assigned VID #2 to the link that extends from node A to node B. Hence, the first entry in the source route is #2. Similarly, node B has assigned VID #3 to the link that extends from node B to node E. As each node reads the source route, it will determine the VID at the head of the source route and use that VID to identify an output link. Thus, when node A receives a frame with source route {#2, #3, #2, #2, #1, #1}, it will use the first entry in the list "#2" and use that VID to identify output link to node B. Hence, node A will forward the frame to node B. Upon reading the first entry in the source route, node A will remove the first entry so that the subsequent node will be able to read the new first entry and use that new first entry to make a forwarding decision for the frame. As shown in FIG. 6, the source route at entry to node A included six values. When node A reads the first value "#2" it will remove that value from the source route so that the source route passed to node B includes only 5 VID values. Node B will read the initial VID value from the source route, remove that value, and forward the frame out the link identified by the specified VID value. As shown in FIG. 6, it is clear that the source route shrinks in size as nodes use VIDs from the source route to forward traffic on the network. By selecting an appropriate source route, using the VID information stored in the link state database, a node is able to source route traffic through the network.

Figure 7:
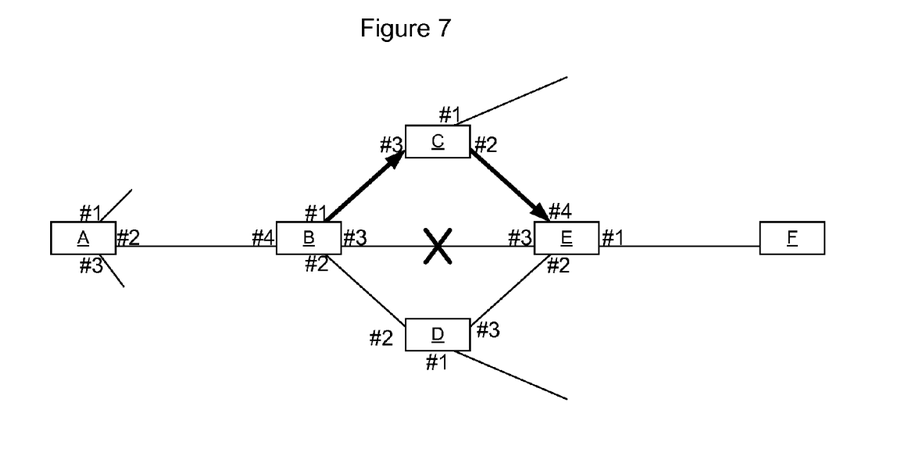
FIG. 7 is a functional block diagram illustrating use of the VID assignment to circumvent a failure on the network of FIG. 5.
Figure 8:
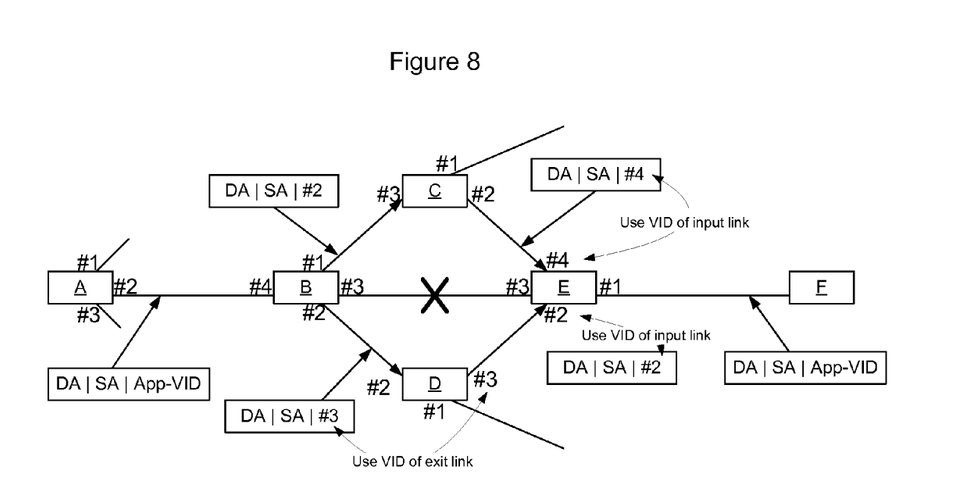
FIG. 8 is a functional block diagram similar to FIG. 7 and providing additional details of the use of VID assignments to circumvent a failure on the network.

FIGS. 7 and 8 show an example of how the VID information may be used to implement local detours within a link state protocol controlled Ethernet network. Specifically, in the example network shown in FIGS. 7 and 8, it will once again be assumed that each of the nodes has advertised their VID/link or VID/adjacency assignment using link state advertisements such that each node has a link state database containing the VID assignment information as well as normal node adjacency information. Upon occurrence of a failure, as shown in FIG. 7, the node adjacent the failure will use this VID assignment information to implement a local detour around the failure as shown in FIGS. 7-8. Specifically, the node upstream from the failure will transmit the traffic that is able to forward the traffic around the failure. Before doing so, however, the node will insert the link ID of the output link at the next hop node so that the next hop node knows where to forward the traffic to cause it to return to the original path.

FIG. 8 shows how the nodes on the network may use the locally assigned and advertised VIDs to implement a detour around a failure on the network. Specifically, in FIG. 8, initially when a frame is transmitted from node A to node B, the frame will have a header including the Destination MAC Address (DA), Source MAC Address (SA) and application VLAN ID (App VID). The application specific VID is carried in the B-VID field of the 802.1ah header. Other fields of the MAC header may also be used, for example the C-VID, S-VID, or other VID field may be used depending on the version of 802.1 Ethernet in use on the network.

Upon detection of a failure by node B, node B will replace the application VID with one of the locally assigned VIDs to indicate to subsequent nodes on the network that the frame is on a local detour. Since the locally assigned VIDs are all assigned from a set VID range, as noted above, whenever a node on the network receives a frame with a B-VID value that is contained within this range, the node will know that the frame is on a detour route through the network. This indicates to the node that the node should not use shortest path forwarding to forward the frame but rather should look at the B-VID value to determine how to forward the frame.

When node B detects a failure, it will determine a route around the failure. In FIG. 8, there are two alternative routes around the failure, a first via node C and a second via node D. Initially, it will be assumed that node B selects the route via node C to implement restoration upon occurrence of the failure.

Hence, node B will determine, from the link state database, the exit link that node C will need to use to cause the frame to be transmitted back onto the normal path via node D. Since node C has advertised that it uses VID #2 to identify the link to node D (or to identify its adjacency with node D), then node B will insert "#2" in the B-VID portion of the header and forward the frame to node C. As shown in FIG. 8, the format of the header when the frame leaves node B is {DA, SA, #2} where #2 identifies the output link from node C to node D.

Node C, upon receipt of the frame from node B, will read the B-VID and determine from the value of the B-VID that the frame is on a local detour around a failure. Note that reading the B-VID in connection with making forwarding decisions is a normal part of IEEE 802.1Qay, so requiring the node to read the B-VID in connection with making a forwarding decision does not require any additional processing where the network is implemented using this version of the Ethernet standard.

Node C, upon reading the B-VID, will determine that the B-VID value is contained within the range used by the nodes to identify their links/adjacencies on the network. Hence, the node will read the value to determine which output link should be used to forward the frame. In the example shown in FIG. 8, B-VID value "#2" is used by node C to identify the link to node E and, accordingly, node C will forward the frame to node E.

It is necessary to enable the nodes on the network to determine when a frame should be taken off the detour path and returned to normal forwarding. To signal that a node should consider itself the end of the detour path, instead of inserting the assigned VID of the output link to be used to forward the frame on the network, the upstream node will insert the assigned VID of the input link at the next node. This indicates to the receiving node that the frame is to be removed from the bypass route and placed once again onto a normal forwarding path through the network.

For example, as shown in FIG. 8, node C knows that node E is the end of the detour around the failure. To indicate to node E that it should return the frame to normal forwarding, node C will replace the B-VID value of the frame with the VID assigned by node E to the link which connects nodes C and E. Thus, in FIG. 8, node E has assigned #4 to the link that connects node E with node C. When C forwards the frame to node E, node C will replace the B-VID value with "#4" and then forward the frame to node E.

When node E receives the frame, node E will read the B-VID and determine that the value of the B-VID is within the range of VID values that are locally assigned by nodes to links on the network. Hence, node E will know that the frame is on a detour path through the network. Node E will also determine that the value of the B-VID is the same as the value assigned by node E to the link on which the frame arrived. Hence, node E will know that it is the end of the detour path and that the frame should be switched back to normal forwarding. Accordingly, node E will re-insert the application VID into the frame and forward the frame toward the destination MAC address using its normal forwarding database. Note, in connection with this, that the nodes on the network are running a link state routing protocol which enables each node to populate a link state database with shortest path forwarding state. When node E receives the frame it will use this forwarding database to make a forwarding decision in a normal manner.

In some networks the nodes on the network will implement a reverse path forwarding check such that if a packet is received on a port other than an expected port, the packet will be discarded. For example, node E may learn that frames having a particular SA, DA pair arrive on a link from node B. When node E receives a frame having the SA, DA pair on the link from node C, the RPFC process may cause the frame to be dropped to prevent formation of a loop. Using the ingress link VID to specify to the last node that the frame is to be taken off the detour path solves this potential RPFC problem, since it causes the frame to appear to have been looped back. Specifically, having the VID identify the ingress link causes the frame to look like it was looped back, which is an old U-turn trick commonly used to identify special behavior. When node E receives a frame of this nature (with the index VID that looks like a loop), it knows not to do RPFC and will swap the VID with the application VID and forward normally. Alternatively, the nodes may be configured to not perform RPFC for any frames containing a VID associated with the range of VIDs assigned by nodes to identify links/adjacencies on the network.

If RPFC is not in use on the network, rather than having the intermediate node insert the link ID of the input port at the termination node, the intermediate node may simply inset the application VID into the frame. Since RPFC is not in use at the termination node, when the termination node receives the frame it will simply forward the packet toward its intended destination on the network. As noted above, RPFC would prevent this behavior so this implementation will not work where RPFC is in use at the termination node since RPFC would cause any packet received at an incorrect port to be dropped by the termination node.

As explained above, according to an embodiment, a range of VID values, e.g. between 64 and 128 VID values, is reserved for implementation of local detours. Each node will assign one of the VID values from this range to each of its links or to each of the adjacencies on the network.

When a packet or frame is received that contains one of these special VID values, the nodes on the network will cause the packet/frame to be forwarded to the corresponding one of its neighbors or to be forwarded on the corresponding one of its links. The node will do this without implementing a DA lookup and without performing RPFC on the packet, but rather will simply forward the frame on the link associated with the special VID value.

Prior to forwarding the packet, the node will swap the VID with the VID associated with the link by the next node on which the packet will be received. When the next hop receives the packet on the link and determines that the VID associated with the packet matches the VID assigned by the node to the link on which the packet was received, the node will determine that it is the end of the detour on the network. No RPFC will be implemented by the node and the VID will be swapped with the application VID. The node will then perform normal DA lookup and forward the packet on the network towards its destination.

In a link state protocol controlled Ethernet network, the nodes on the network will use the link state database to determine forwarding state and will install forwarding state into a forwarding database. According to an embodiment, the nodes on the Ethernet network may determine alternate forwarding state assuming an error on the network to compute one hop detours for each destination and also install this alternate forwarding state in the forwarding tables of the outgoing interfaces. This alternate forwarding state will include the VID to be included in the packet when forwarding the packets on the alternate (detour) routes through the network, so that the calculation of which output port and what VID value is determined prior to occurrence of the failure and installed in the forwarding tables of the node. By installing the information (output port and VID) to be used in the event of a failure, the node may cause traffic to be rerouted around the failure very quickly and without waiting for the control plane to generate and install that information. Further, since each node on the network performs this calculation locally based on information obtained from exchanges associated with the link state routing protocol, signaling is not required to establish the detours on the network and explicit state is not required to be exchanged between nodes so that coordination between nodes is maintained at a minimum.

In one implementation, IS-IS neighbor hello messages are extended to include a list of neighbors, not only those neighbors that are located on the communication network but also the neighbors that are reachable by the node off the network. For example, referring back to FIG. 1, node A would include neighbors from the client network that are reachable via node A when exchanging hello messages with other nodes on the provider network 10. Further, the hello messages are also extended to include the special VID assigned by the node to reach each of its neighbors. Optionally, an extended neighbor information field of the IS-IS hello message may be used to contain the link identifiers/VIDs assigned by the node.

In some network implementations, there may be two or more equal cost paths to a destination. When this occurs, the nodes may select one of the paths to be used to forward all traffic, or may use each of the paths to forward a portion of the traffic. Commonly, use of multiple equal cost paths is referred to as ECMP (Equal Cost MultiPath).

Figure 9:
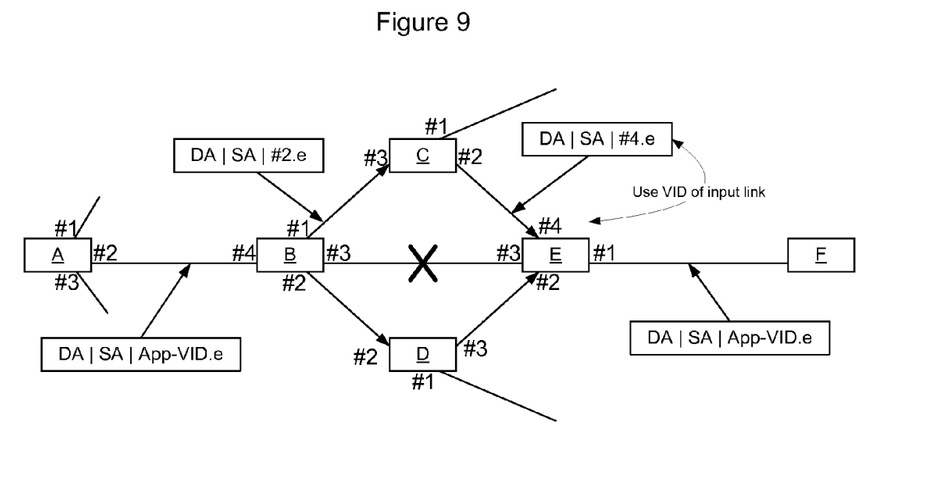
FIG. 9 is a functional block diagram similar to FIG. 7 and providing additional details of the use of VID assignments in connection with equal cost multi path (ECMP) to circumvent a failure on the network.

FIG. 9 shows a network where ECMP is used. When ECMP is in use on the network, one way to designated traffic as belonging to one or the other equal cost paths is to refer to traffic on one of the paths as odd and traffic on the other path as even. Since different traffic is forwarded on different paths, it would be advantageous to instruct the node at the end of the detour path how to forward the traffic—i.e. to allow the destination node to properly select one of the equal cost paths for the traffic.

To enable the destination node on the detour to assign the correct (odd or even) application VID to the packet for further transmission on the network, the link identifiers used to transport the packet on the detour through the network should be able to specify to the terminating node at the end of the detour path whether the original application VID was even or odd. For example, the least significant bit of the VID may be reserved and used to carry the odd/even nature of the original VID through the detour.

Thus, where ECMP is in use on the network, in one embodiment each node on the network will assign two VIDs to each link to be used as link identifiers. For example, where a 20 bit VID is in use, the node will assign a pair of VIDs having the same value in the 19 most significant places to the link, and the $20^{th}$ bit (the least significant bit) can be used to specify whether the packet should be placed on the odd/even ECMP path. Both of the locally assigned link identifiers are used to identify the same output link on the node. However, one of the locally assigned link identifier is used to carry traffic that was originally associated with an odd ECMP route and the other locally assigned link identifier is used to carry traffic that was originally associated with an even ECMP route. When the node receives a packet containing either of the VIDs the node will identify the correct output link. Further, the node will use the least significant bit to set the least significant bit of the next link identifier which is inserted into the packet prior to transmission on the network. In this manner the even/odd nature of the ECMP traffic may be carried on the detour through the network so that the destination node on the detour may return the traffic to the correct ECMP when the packet is forwarded on the network.

Figure 10:
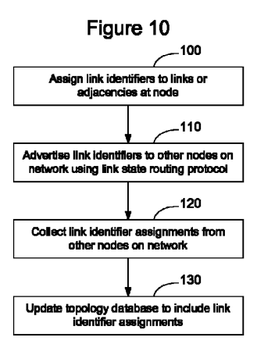
FIGS. 10-13 are flow charts of processes that may be implemented to enable VID assignment to be used to circumvent a failure on the network.

FIG. 10 illustrates a process of locally assigning and advertising link identifiers on a routed Ethernet network. As shown in FIG. 10, each node on the Ethernet network will assign link identifiers to links or adjacencies at the node (100). In one embodiment, the link identifiers are assigned from within a particular agreed-upon range which is used by all network elements on the network. Although any link identifiers may be used, where the field of the Ethernet header is used for other purposes, the link identifiers locally assigned by the node should not be used by other nodes on the network for other purposes. Hence, allocating link identifiers from within a reserved range is a convenient way to ensure that normal traffic on the network will not inadvertently contain a value in the field which may signal to one of the nodes that the traffic is on a local detour. For example, where the nodes on the network assign B-VID values as link identifiers. If the nodes assigned B-VID values that overlapped with application B-VID values, normal traffic may appear to one or more of the nodes as traffic associated with a local detour. Accordingly, reserving a range of B-VID values for use as link identifiers prevents any conflict between detour traffic and normal traffic on the network. There may be other ways of avoiding this type of conflict as well, however.

Once the nodes assign the link identifiers to their local links/adjacencies, the nodes will advertise the link identifiers along with the links/adjacencies to other nodes on the network using the link state routing protocol (110). Specifically, the nodes will generate and transmit a link state protocol link state advertisement packet. These link state advertisements will be flooded to all nodes on the routed Ethernet network.

Nodes on the routed Ethernet network collect information from the link state advertisements from other nodes on the network (120) and use the information to create an updated topology database (130). The updated topology database includes not only the topology of the network, i.e. which node is connected to which other node, but also includes the locally assigned link identifier which has been assigned by the nodes to identify their links or adjacencies. The topology database may be used in a normal manner to calculate shortest path forwarding paths and/or traffic engineered paths through the network. This forwarding state will then be programmed by the node into its dataplane to enable the node to forward traffic on the network efficiently.

Figure 11:
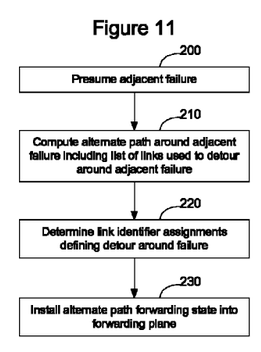

FIG. 11 shows an example process that may be used by a node to calculate a set of local detours assuming adjacent failures within the network. Specifically, prior to occurrence of a failure on the network, each node on the network will assume a loss of connectivity of a downstream node and calculate a local detour that may be utilized to circumvent the failure upon occurrence of the loss of connectivity. For purposes of discussion it will be assumed that the nodes are focusing on looking for node diverse paths two hops into the network which will suffice for both link failure between the node and its neighbor as well as for failure of the neighbor.

Specifically, as shown in FIG. 11, each node will cycle through each of its neighbors and presume an adjacent failure at that neighbor (200). The node will compute an alternate path around the adjacent failure (a detour path) and determine which set of links should be used via the available neighbors to route traffic around the presumably failed node back onto the shortest path to a particular destination (210). The node will do this for all destinations having shortest paths that pass through the neighbor. Since the goal is for the node to pass traffic on a detour path around the failure to cause the traffic to rejoin with the original shortest path, different destinations may have different detour routes for one presumed failure. For example, referring to FIG. 2, when node F presumes a failure of node G, that failure may affect traffic on a shortest path from node F to nodes D, H, and K. Node F will calculate detour routes to reach each of nodes D, H, and K since shortest path forwarding for each of these nodes will be affected by a failure of node G. Likewise, node F may have a traffic engineered path to destination node C that is required to pass through node G. Accordingly, node F will also look for detours for traffic engineered paths on the network (where the traffic engineered path definition does not specify the alternate path to be used in the event of a failure).

In connection with computing the alternate paths, the node will determine link identifier assignments defining the detour around the failure (220). The link identifiers to be used when traffic is placed onto a detour path will then be programmed into the forwarding plane to enable the node to quickly adjust the flow of traffic on the network when a failure is detected on the network (230). As noted above, this process is performed by each node on the network assuming a failure of each adjacency. Then, for each adjacency, the node will look to determine what flows of traffic are affected and, for each flow of traffic, a locally determined detour will be calculated and installed to provide for a redundant forwarding paths in the event of a failure. The installed detour will include an output port to be used for that flow of traffic (to cause the traffic to be forwarded to a selected adjacency) as well as a detour VID to be inserted which will allow the traffic to be forwarded correctly by the selected adjacency.

Figure 12:
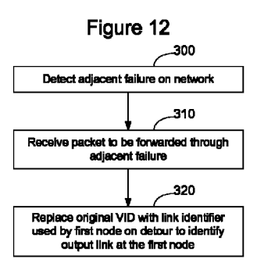

FIG. 12 is a flow chart of a process using a detour path to forward traffic around a detected error on the network. As shown in FIG. 12, when a node detects a failure on the network (300), and receives a packet to be forwarded through the link on which the failure has been detected (310), it will replace the original application VID with the link identifier used by the first node on the detour path which is used by the intermediate node to identify the output link at that node (320). By inserting the link identifier of the output link at the first node on the detour path, the initiating node on the detour path can instruct the intermediate node how to forward the packet. Specifically, the intermediate node will receive the packet, determine that the packet contains a VID within the range of VIDs reserved for detour traffic, and forward the packet on the link identified by the VID.

Figure 13:
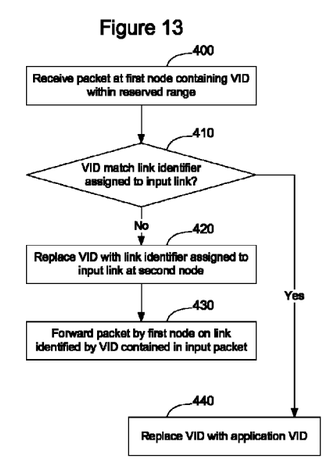

FIG. 13 is a flow chart of a process that may be used by a terminating node to transition traffic from the detour path to normal forwarding on the network. As shown in FIG. 13, when a node receives a packet containing a VID within the range of VIDs reserved for detour traffic (400) it will check to determine whether the VID matches the link identifier assigned to the input link (410). The purpose of this check is to determine whether the node is an intermediate node on the detour or whether the node is the terminating node on the detour. If the node is an intermediate node on the detour, the link identifier contained in the packet header will not match the link identifier assigned by the node to the input link (NO at block 410). In this instance, the node will identify the output link using the link identifier, determine the link identifier associated with the link on which the traffic will be placed at the terminating node, and replace the VID with the link identifier assigned to the input link at the terminating node (420). The intermediate node will then forward the traffic toward the terminating node (430).

If the incoming packet contains a link identifier that matches the link identifier assigned by the receiving node to the input link—i.e. if a packet is received at a node and the link identifier contained within the packet header matches the link identifier of the input link at that node, the node will determine that it is the terminating node on the detour path (YES at block 410). If so the node will replace the link identifier with the application VID (440) and forward the packet as if it had been received in a normal manner. For example, where shortest path forwarding is in use on the network the terminating node will replace the detour link identifier VID with the application VID and forward the packet on the shortest path toward its destination.

Figure 14:
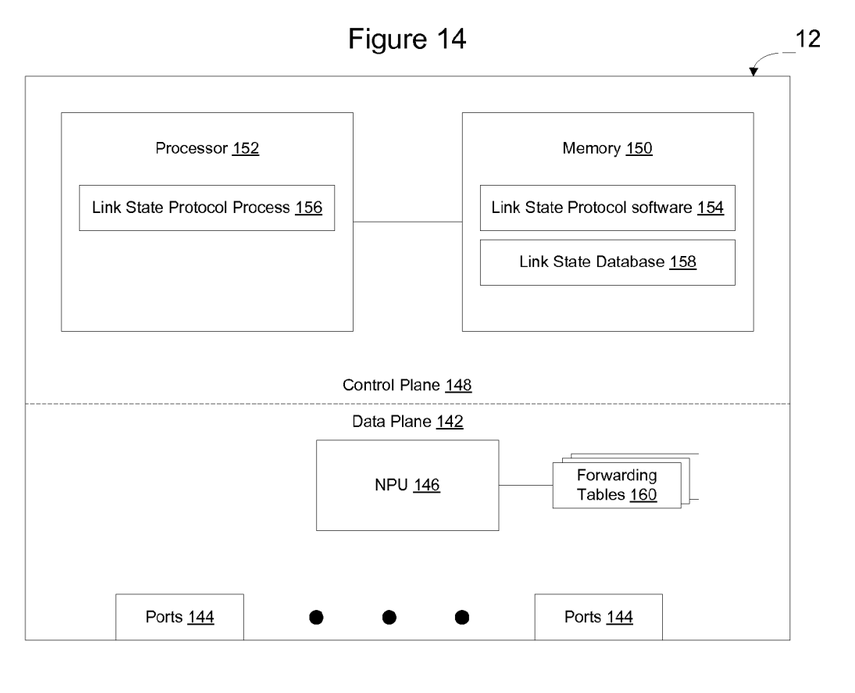
FIG. 14 is a functional block diagram of an example Ethernet node that may be used on one of the link state routed Ethernet networks illustrated in FIGS. 1-9.

FIG. 14 is a functional block diagram of a node 12 that may be used to implement distributed computation and implementation of detours on the network. As shown in FIG. 14, the network element includes a data plane 142 to handle receipt and forwarding of traffic on the network. Commonly the data plane includes one or more ports 144 as well as processing circuitry such as network processing unit 146 to forward traffic on the network. When a packet is received, the network processing unit is used to forward the packets using one or more fields of the header, such as the B-DA and B-VID described in connection with FIG. 1. According to an embodiment, the network processing unit includes an indication of the assignment of output port and link identifier such that if a packet is received with a link identifier within the reserved range of link identifiers, the network element will handle forwarding of the packet as described above.

Specifically, if the packet has a VID that is within the range of reserved link identifier values, the network processing unit will perform a check to determine the link identifier associated with the link on which the packet arrived. If the link identifier of the packet does not match the link identifier on which the packet arrived, the network processing unit will cause the packet to be forwarded on the output link corresponding to the link identifier. If the link identifier matches the link identifier of the input link on which the packet was received, the network processing unit will replace the link identifier with the normal application specified VLAN ID value and forward the packet based on the combination of B-VID and VID as if it had arrived at the network element on the normal path rather than on the detour path.

The network element 12 also includes a control plane 148 configured to control operation of the network element on the Ethernet network. For example, the functions described herein associated with operation of the network elements may be implemented using one or more sets of program instructions stored in a computer readable memory 150 and executed on one or more processors 152 on the network element. For example, as shown in FIG. 14, the network element includes a memory containing link state routing protocol software 154 which, when loaded into a processor environment, enables the network element to implement a link state routing process 156. Through the exchange of routing updates, e.g. link state advertisements, the link state routing process will create a link state database 158 that may also be stored in memory or stored in another storage device. Other software may similarly be stored in memory and loaded as necessary into the processor environment to enable the network element to function on the network.

The routing process, in addition to creating the link state database, may be used to determine how traffic should be forwarded on the network, for example by calculating a set of shortest path trees to destinations on the network. The shortest path trees and traffic engineered paths will be used to create a forwarding tables that are programmed into the network processing unit 146 to enable the network processing unit to implement forwarding decisions on traffic on the network.

The routing process, according to an embodiment, will also pre-compute detours around presupposed failures on the network and determine, from the link assignments stored in the network topology database, which link identification values should be used to implement the detours. The link identification values will also be passed to the network processing unit and included in the forwarding tables to allow the alternate forwarding state to be available in the forwarding tables 160 of the network processing unit before occurrence of a failure on the network. Upon detection of the failure, this alternate forwarding state will be used by the network processing unit to enable traffic to be shifted from its normal path to the detour path. Having the alternate forwarding state pre-programmed into the data plane allows failover to occur very quickly and without intervention of the control plane.

Although embodiments were described herein that are at times specific to routed Ethernet networks, particularly a routed Ethernet network implemented using 802.1aq, other types of routed Ethernet networks may utilize these concepts as well. For example, embodiments of the invention may be implemented in an RBRIDGE network or a TRILL network.

The functions described herein may be implemented in software, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as hardware logic, a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A node for a link state protocol controlled Ethernet network, the node comprising:
at least one network interface;
a data plane coupled to the at least one network interface;
at least one control plane processor coupled to the data plane; and
at least one memory element storing instructions for execution by the at least one control plane processor, the instructions comprising:
instructions executable to assign a respective link identifier to each adjacency or output link of the node;
instructions executable to generate and transmit, on the link state protocol controlled Ethernet network, a link state routing protocol link state advertisement indicating a list of adjacencies or output links and corresponding assigned link identifiers; and
instructions executable to compute at least one detour route using the link identifiers of neighboring nodes to determine at least one one-hop detour around adjacencies for use in the event of a failure involving at least one of the adjacencies.

2. The node of claim 1, wherein the instructions executable to assign link identifiers comprise instructions executable to assign Virtual Local Area Network Identifiers (VIDs) as link identifiers.

3. The node of claim 1, wherein the instructions executable to assign link identifiers are instructions executable to assign link identifiers from a range of link identifiers that is reserved for use in connection with distributed failure recovery in the link state protocol controlled Ethernet network.

4. The node of claim 1, wherein the instructions executable to assign link identifiers comprise instructions executable to assign link identifiers from a range of link identifiers that encompasses approximately a maximum number of expected adjacencies at each node in the link state protocol controlled Ethernet network.

5. The node of claim 1, wherein the instructions executable to assign link identifiers comprise instructions executable to assign link identifiers from a range of link identifiers that encompasses approximately two times a maximum number of expected adjacencies at each node in the link state protocol controlled Ethernet network.

6. The node of claim 5, wherein the instructions executable to assign link identifiers comprise instructions executable to assign two link identifiers to each of their adjacencies or output links to enable equal cost multipath traffic to be differentiated on the detour routes.

7. The node of claim 1, wherein the instructions comprise instructions executable to populate a forwarding table in the data plane with forwarding information implementing the at least one detour route to enable the data plane to:
receive a protocol data unit having a MAC header and containing data to be forwarded on the link state protocol controlled Ethernet network;
replace an application VID from the MAC header with one of the link identifiers; and
forward the protocol data unit on the at least one detour route based on the link identifier used to replace the application VID.

8. The node of claim 7, wherein:
the instructions comprise instructions executable to determine a link on a detour route that will cause the protocol data unit to return to an intended path through the network at another node; and
the instructions executable to populate the forwarding table comprise instructions executable to populate the forwarding table to enable the data plane to:
replace the application VID with a link identifier assigned by the other node to the link on the detour route that will cause the protocol data unit to return to the intended path; and
forward the protocol data unit to the other node.

9. The node of claim 7, wherein the instructions executable to populate the forwarding table comprise instructions executable, when the node is on a detour path, to populate the forwarding table to enable the data plane to replace a link identifier in a protocol data unit received on the detour path with a link identifier for a link to a next node on the detour path to enable the data plane to forward the protocol data unit to the next node on the detour path.

10. The node of claim 7, wherein the instructions executable to populate the forwarding table comprise instructions executable, when the node is a last node on a detour path, to populate the forwarding table to enable the data plane to replace a link identifier in a protocol data unit received on the detour path with the application VID.

11. The node of claim 1, wherein the link identifiers assigned by the node on the link state protocol controlled Ethernet network are not globally unique within the network.

12. The node of claim 1, wherein the link identifiers assigned by the node have only local significance to enable the node to identify adjacencies or output links 13. The node of claim 1, wherein the instructions executable to compute at least one detour route to determine at least one one-hop detour comprise instructions executable to compute at least two detour routes for at least one adjacency for use in the event of a failure involving the adjacency.

14. The node of claim 13, wherein the instructions comprise instructions executable to select at least one of the at least two detour routes for use in the event of a failure involving the adjacency.

15. The node of claim 14, wherein the instructions executable to select at least one of the at least two detour routes comprise instructions executable to select one of the at least two detour routes to forward all of the traffic in the event of a failure involving the adjacency.

16. The node of claim 14, wherein the instructions executable to select at least one of the at least two detour routes comprise:
instructions executable to select at least two of the at least two detour routes; and
instructions executable to forward a respective portion of the traffic on each of the selected detour routes in the event of a failure involving the adjacency.

17. The node of claim 16, wherein:
the selected at least two detour routes have equal costs; and
the instructions executable to forward a respective portion of the traffic on each of the selected detour routes implement Equal Cost Muli-Path (ECMP) forwarding.

18. A node for a data network, the node comprising:
at least one network interface;
at least one processor coupled to the at least one network interface; and
at least one memory element storing instructions for execution by the at least one processor, the instructions comprising:
instructions executable to detect a failure on the data network; and
instructions executable to populate a forwarding table to enable the node, on reception of data traffic forwarded on the data network toward a destination that requires the data traffic to be transmitted across the failure, the data traffic being formatted in protocol data units including a media access control header indicating at least one virtual local area network identifier (VID), to enable the node to replace the VID with a VID assigned by a detour node to an output link connecting the detour node with a node beyond the failure toward the destination and to forward the data traffic toward the detour node on the data network.

19. A forwarding node for a routed Ethernet network, the node comprising:
at least one network interface;
at least one processor coupled to the at least one network interface; and
at least one memory element storing instructions for execution by the at least one processor, the instructions comprising instructions executable to populate a forwarding table to enable the node, on reception of data traffic formatted in protocol data units including a media access control header having at least one virtual local area network identifier (VID) having a value within a range of VID values reserved for distributed failure recovery in the routed Ethernet network, to enable the node to forward the data traffic on the routed Ethernet network based on the VID.

20. The node of claim 19, wherein the instructions for populating the forwarding table comprise:
instructions executable to determine a value of another VID assigned by another node to an output link; and
instructions for populating the forwarding table to enable the node to replace the VID with the other VID prior to forwarding the data traffic on the output link toward the other node.

* * * * *